Patented May 13, 1941

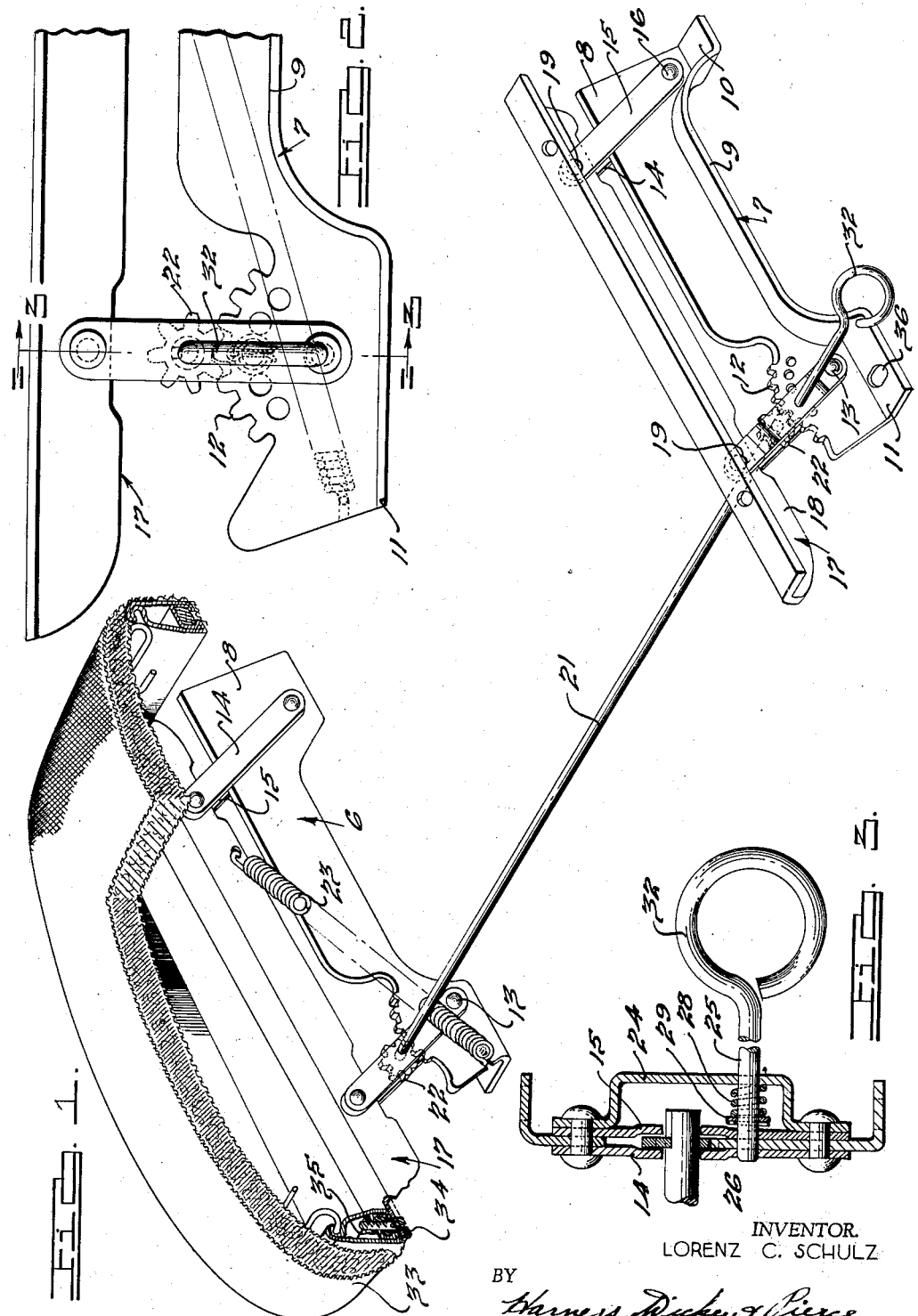

2,241,559

UNITED STATES PATENT OFFICE 2,241,559

ADJUSTABLE SEAT SUPPORT

Lorenz C. Schulz, Detroit, Mich., assignor to The Murray Corporation of America, Detroit, Mich., a corporation of Delaware Application March 18, 1938, Serial No. 196,593

3 Claims. (Cl. 155—14)

My invention relates to seat constructions, and particularly to a seat cushion of the automotive vehicle type which is adjustable in height as well as longitudinally of the vehicle body.

Various means have been employed heretofore for supporting a vehicle seat for adjustment embodying tracks upon which the seat cushion is slidable. The tracks were usually mounted in the floor of the body flush with the floor surface but since metal floors are now employed in place of those made of wood such tracks could no longer be recessed. More recently raised supports were employed for the tracks which were raised above the floor and in some instances arcuately curved to permit the seat to be adjusted forwardly and rearwardly while the seat tilts on the supports. Difficulty was always experienced when employing the tracks because the seat was usually adjusted from one side of the vehicle resulting in the binding of the frame on the track.

In practicing my present invention, I employ a novel method of supporting the seat which permits adjustment relative to the longitudinal dimension of the body, as well as in height without producing a tilting of the seat, or the binding of the supporting element. For effecting this unique mounting, I provide standards upon which links are pivoted and extended thereabove to be pivotally joined to the seat at points forming a parallelogram. This parallelogram mounting of the seat permits the seat to be adjusted longitudinally of the vehicle body and in height while retaining the seat in parallel relation to the floor of the vehicle.

The forward adjustment of the seat lowers the seat relative to the floor while the reverse, or rearward movement of the seat raises the seat. Gear sectors are provided on the standards and at least one pair of links are interconnected crosswise of the vehicle by a rod carrying a pinion at each end and meshed with the sectors. Such an interconnection prevents any twisting of the seat from or binding of the frame and links on the standards when the seat is adjusted from one side thereof. At least one of the links is provided with a latch for locking the link relative to the standard.

A spring pressed pin is herein illustrated extending through the link and through a plurality of apertures in the standard. A spring is provided between the seat and standard for biasing the seat forwardly to reduce the effort required to move the seat forwardly, since the vehicle occupant has a greater leverage for forcing the seat rearwardly.

Accordingly, the main objects of my invention are; to provide standards to which a seat is pivotally supported on pairs of links; to mount a seat on two pairs of pivotal links to form a parallelepiped support which permits the seat to be regulated relative to the vehicle floor without tilting the seat; to mount a seat cushion on pairs of parallel links, some of which are interconnected by an element in operating relation with the link supporting elements for transferring a force for moving the seat from one side to the other thereof; to provide a pair of standards with a sector of a gear and with pivotal links for a seat and interconnecting one pair of links with a shaft having a pinion on its end which operates in said sectors when the seat is adjusted; to mount a seat on links which are supported on standards and provided with latching means for retaining the links in predetermined relation thereto; and in general, to provide mounting means for a seat by which it is adjustable forwardly and rearwardly without tilting the seat, all of which is rugged in construction, positive in operation and economical of manufacture.

Other objects and features of novelty of my invention will be specifically pointed out, or will become apparent when referring, for a better understanding of my invention, to the following description taken in conjunction with the accompanying drawing wherein:

Figure 1 is a broken perspective view, with parts in section, of a seat cushion supporting means embodying features of my invention;

Fig. 2 is an enlarged, broken view in side elevation of the cushion supporting element illustrated in Fig. 1; and, Fig. 3 is a sectional view of the structure illustrated in Fig. 2, taken on the line 3—3 thereof.

The seat cushion and supporting structure illustrated in Fig. 1, embodies a pair of standards 6 and 7, which may be castings or which are preferably stampings formed to provide upstanding webs 8 and outwardly directed flanges 9 which form supporting feet 10 and 11 at the rear and front portion thereof, respectively. At the front upper edge of each web 8, a gear sector 12 is provided directly in the web on an arc disposed about an aperture through which a rivet 13 extends.

Four pairs of links 14 and 15 are pivoted to the two standards, the front pair of links being secured to the standards by the rivets 13, while rivets 16 are employed for securing the rear pair of links 14 and 15 thereto. A pair of angle members 17 having a downwardly extending flange 18 aligned with the web 8 of the standards are disposed between the links 14 and 15 to which they are pivoted by rivets 19.

The distance between the rivets 19 on both flanges 18 are equal to the distance between the rivets 13 and 16, and since the links are of the same length, a support in the nature of a parallelepiped is provided for the seat. The angular disposition of the links 14 and 15 may be changed to regulate the position of the members 17 relative to the standards 6 and 7.

The pairs of links 14 and 15 at the front end of the standards are interconnected by a shaft 21 having a pinion 22 rigidly secured to each of its ends between the links 14 and 15. The teeth of the pinions 22 mesh with the teeth of the sectors 12, and any force applied at one side of the seat during its adjustment will be transferred to its other side to prevent the warping and binding of the seat on the links.

In view of the fact that a person has a greater leverage for forcing the seat rearwardly to effect the adjustment, a coil spring 23 may be utilized between the frame 17 and the standard 6, at one or both sides of the seat to provide a bias for urging the seat forwardly. It will also be noted that the sloping of the links are forwardly which also aids in the forward adjustment of the seat. As a result, the forward adjustment of the seat may be effected just as readily as the rearward adjustment thereof in spite of the greater leverage had by a vehicle occupant for adjusting the seat rearwardly. However, it is within the purview of my invention to have the pairs of links 14 and 15 slope rearwardly instead of frontwardly as illustrated, to have the seat raised when moved forwardly to raise a small occupant as the occupant moves forwardly and to lower a larger occupant as the occupant adjusts the seat rearwardly.

On the front right link, as viewed in the figure, a saddle 24 is secured on the side of the links 15 by the rivets 13 and 19. A pin 25 projects through an aperture in the saddle and through apertures 26 in the links 14 and 15. A plurality of apertures 27 are provided in the webs 8 disposed on an arc about the rivets 13 aligned with the pin 25. A spring 28 is disposed on the pin 25 having one end contacting the inner surface of the strap 24, and the other end resting against a washer 29 retained on the pin by a cotter pin 31.

Gripping means 32 is provided on the end of the pin 25 herein illustrated as an eye, but which may be a separate handle by which the pin 25 may be moved outwardly to withdraw its end from the aperture 26 in the link 14 and the aperture 27 in the web 8 to permit the seat to be shifted relative to the standard. After the seat is shifted, the release of the pin permits the ends thereof to pass through an aperture 27 and the aperture 26 in the pin 14, to lock the seat in adjusted position.

A seat cushion 33 rests upon the angle member 17 and is secured thereto by suitable means, herein illustrated as by bolts 34 which pass through the frame of the cushion and are threaded in nuts 35 which are welded or otherwise retained on the border frame.

When adjusting the cushion, the pin 25 is moved outwardly to release the link, permitting the seat to be moved frontwardly or rearwardly to a desired position, after which the release of the pin permits it to move through an aperture 27 in the web 8, to lock the seat in position. During the adjustment, the seat is always retained parallel to any of its positions since the pivotal support forms a parallelepiped. The seat is adjusted in height when moved forwardly and rearwardly and by selecting the proper tilt to the links the seat may be raised or lowered in either direction of movement. The adjustment is positive at both sides of the seat in view of the interconnection of one pair of links by a shaft having pinions in mesh with gear sectors provided on the standards. An aperture 36 may be provided in the supporting feet 10 and 11 through which bolts may extend for securing the standards to the floor of a vehicle.

While I have described and illustrated but a single embodiment of my invention, it will be apparent to those skilled in the art that various changes, omissions, additions and substitutions may be made therein without departing from the spirit and scope of my invention, as set forth in the appended claims.

I claim as my invention:

1. A seat embodying a pair of spaced standards, seat supporting members, and links interconnecting the supporting members on the standards at points forming a parallelepiped, a seat cushion supported on said supporting members, a shaft journalled in oppositely disposed links, pinions carried by said shaft, and a gear sector having fixed relation to each of said standards in meshed relation with said pinions for moving said shaft relative to said sectors when the seat is adjusted to equalize the position of said links at all times.

2. A seat embodying a pair of spaced standards, seat supporting members, and links interconnecting the supporting members on the standards at points forming a parallelepiped, a seat cushion supported on said supporting members, a shaft interconnecting oppositely disposed links and pivoted thereon, pinions carried by said shaft, a gear sector integral on each of said standards in meshed relation with said pinions, said shaft and pinions forming an equalizer for retaining said links aligned and means for locking one of said links to a standard at various points to retain said seat in adjusted position.

3. A support for a seat including, spaced supporting elements, links pivoted to said elements and disposed in parallel relation to each other, a shaft interconnecting opposite links and pivoted thereon, pinions carried by said shafts, and a gear sector integral on each of said supports in meshed relation with said pinion for transferring an adjusting force from one side to the other of said seat for retaining said links aligned.

LORENZ C. SCHULZ.